May 23, 1950 V. E. PRATT ET AL 2,508,651
WINDING DEVICE
Filed June 7, 1946

INVENTOR.
VERNEUR E. PRATT
GEORGE F. GRAY
BY
Van Deventer + Grier
ATTORNEYS

Patented May 23, 1950

2,508,651

UNITED STATES PATENT OFFICE 2,508,651

WINDING DEVICE

Verneur E. Pratt and George F. Gray, Norwalk, Conn.

Application June 7, 1946, Serial No. 675,261

3 Claims. (Cl. 242—74)

This invention relates to winding devices as commonly used to wind strips on reels. In such devices heretofore known, it has been the practice to start the end of the strip to be wound on the reel by inserting it in a slot in the hub thereof and then revolving the reel a turn or two until the strip is wound on itself and thereby held to the hub. It is often difficult to so insert the end of the strip in the slot in the hub, as the latter is located between the heads of the reel. It is also difficult, and sometimes impossible, to turn the reel independently of the apparatus with which it is used. The film often slips out of the hub while under tension, and then the reel no longer winds.

Sometimes the strip is perforated, and a pin in the hub engages the perforation to hold the reel end while winding. Such arrangements are objectionable when it is desired to use imperforate strips. The perforations tear and it is often difficult to place the perforated strip on the pin in the reel hub. Under tension the perforation tears, and the reel no longer winds.

The present invention has for its objects the elimination of the foregoing objections and disadvantages, and has as a further object the provision of a winding device that can be used with existing equipment as it does not require changes to be made in the reel-driving mechanism.

Another object is to provide a winding device particularly adapted for use with imperforate photographic film and comprising an improved film reel for use in cameras, projectors, readers, and the like, and more especially for use with microfilming apparatus.

It will be understood, however, that the invention is not limited in respect to its application, and that the film reel here shown and described as a preferred embodiment of the invention is merely illustrative, the invention being as defined by the appended claims.

Figure 2:
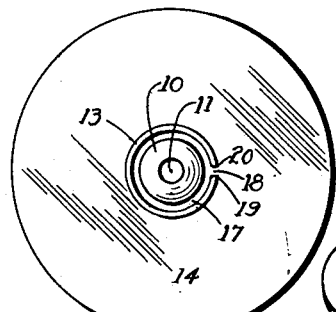
Figure 2 is a top view of the reel, Figure 1.
Figure 1:
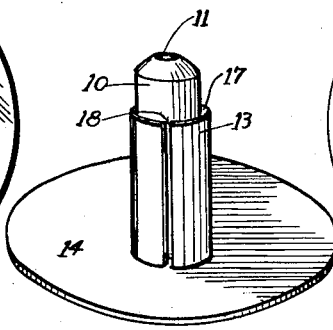
Figure 1 is a perspective view of a film reel embodying the invention.

Referring to Figure 1, the numeral 10 denotes the hub of the reel having a central bore 11 so that it can be mounted on a shaft (not shown) to revolve therewith, or thereon. The hub can be revolved by a pin (not shown) revolving around the axis of the hub and engaging the hole 12 therein. The hub can be mounted and revolved in any manner.

Figure 3:
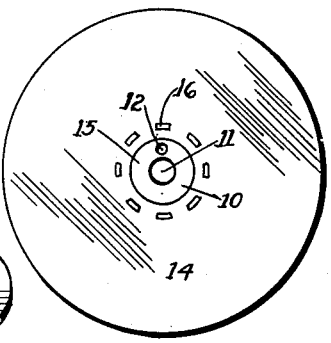
Figure 3 is a bottom view of the reel, Figure 1.

Surrounding the hub 10 is a cuff 13. The hub and cuff are secured to a head member 14 in any suitable manner, such as by upsetting or spinning the hub into the member 14, as indicated at 15, and providing the end of the cuff with a plurality of ears 16 which are crimped to the head as best shown in Figure 3.

The inner wall of cuff 13 is spaced apart from the outer wall of the hub 10 to provide an annular space 17 between the cuff and the hub for the reception of a loop of film as presently described.

The cuff 13 has a longitudinal slot 18 extending from end to end thereof which should be wide enough to receive two thicknesses of the film, or other material to be wound; from $\frac{3}{32}$" to $\frac{1}{4}$" is wide enough for film when the sleeve is about 1" O. D. and $\frac{1}{16}$" thick, and the hub $\frac{13}{16}$" diameter. This leaves the annular space 17 approximately $\frac{1}{16}$" wide, which is sufficient to receive the loop of film. Such a construction brings the lips 19, 20 of the slot in position relative to the film in the slot to grip the film when the reel revolves as presently described.

A second head 21 may be detachably secured to the hub 10 and closes the annular space 17. This head may have the usual snap-ball arrangement as shown at 22 so it is easily removed and replaced on the hub without tools.

Figure 4:
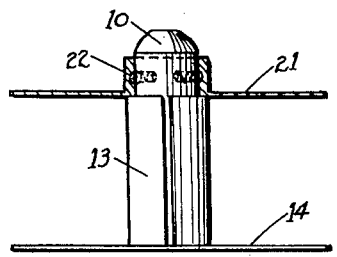
Figure 4 is a side elevational view of the reel, Figure 1, with a removable head member.

The reel as shown in Figure 1 can be used without the second head 21, but film reels usually have both heads, as shown in Figure 4.

Figure 5:
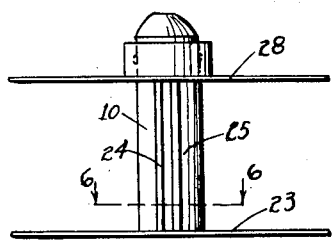
Figure 5 is a side elevational view of a modified form of film reel embodying the invention.
Figure 6:
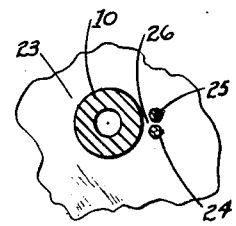
Figure 6 is a sectional view on the line 6, 6 of the reel, Figure 5.

An alternate form of reel is shown in Figures 5 and 6. Here the hub 10 is secured to a head member 23 in the same manner as described in connection with head member 14 of Figure 1.

A pair of pins or gripping members 24, 25 are also riveted to head 23. These members are spaced apart from hub 10 to provide a space 26 which is equivalent to space 17 in Figure 1, and the members are also spaced from each other to provide the space 27 therebetween, which is equivalent to slit 18 in Figure 1.

If desired, a second head 28 may be detachably secured to the outer end of hub 10 and may be apertured to receive the upstanding ends of members 24, 25 in a manner that will be obvious.

The reel shown in Figure 5 can be used without the second head 28, but film reels usually have both heads, as shown.

Figure 7:
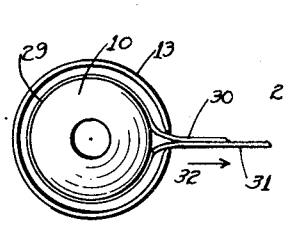
Figure 7 is a diagram illustrating the starting position of a film on the reel, Figure 1.

In operation, a loop 29, Figure 7, is placed in the space 17 between hub 10 and cuff 13. This loop has a short end 30 which may extend outwardly from the hub for a short distance, say 1" to 1½", and the long end 31 which usually extends to and is part of another reel of film.

When the film and reel are in the position shown in Figure 7, if a straight pull is exerted in the direction of the arrow 32, the loop 29 can be easily pulled out of the reel without damage to the film. This enables the film to be automatically detached, as it were, assuming it is being wound off the reel in the direction of arrow 32. In this case, the reel shown in the figure could be the supply reel, and the reel to which end 31 of the film extends is the take-up reel.

Figure 8:
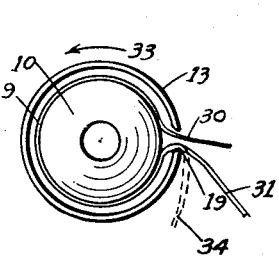
Figure 8 is a diagram illustrating the binding of the film when the reel revolves anti-clockwise.

Referring to Figure 8, if the reel shown therein is now a take-up reel on which film is being wound, and the reel is turning anti-clockwise, as indicated by arrow 33, the lip 19 of cuff 13 will engage and bear against the long end 31 of the film which is under tension from the delivery reel (not shown). Some slight slippage of the loop 29 may occur and the short end 30 of the film is shortened; but before the loop of film can escape from the reel, it has revolved sufficiently to sharply bend the film at lip 19 (the film now being in the position indicated by dotted lines 34) thus further slippage is prevented, and as the reel continues to revolve the short end 30 of the film is wrapped down and under the first convolution of the long end, and the film winds on to the outer surface of cuff 13.

Figure 9:
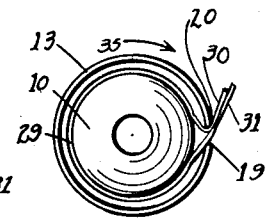
Figure 9 is a diagram illustrating the binding of the film when the reel revolves clockwise.

Should the revolution of the reel be clockwise, as shown by the arrow 35 in Figure 9, the short end 30 of the film is gripped by the long end 31 thereof, as both ends overlie the lip 20 of the cuff which engages them. The loop 29 cannot slip and the film is wound on the cuff as previously described.

The operation of the reel shown in Figures 5 and 6 is the same as that just described. Here the members 24, 25 act to grip and hold the film in the same manner as the lips 19, 20 of the reel, Figure 1.

What is claimed is:

1. A winding device including a hub, a head secured thereto, and a pair of gripping members comprising parallel pins permanently secured to said head and spaced apart to define a slot therebetween and extending axially parallel to the face of said hub and spaced apart therefrom, said slot being adapted to receive the outwardly extending ends of a loop of material embracing said hub to be wound over said hub and members to form a roll.

2. The device as claimed in claim 1 including a second head member detachably secured to said hub and engaging the remaining ends of said gripping members.

3. A winding device including a pair of heads, a hub secured between said heads around which a loop of material having a long and a short end may be placed so that said ends may freely extend outwardly from said hub, and means including a pair of gripping members secured to said heads and spaced apart from said hub to hold the ends of said loop together whereby the long end of said loop may be wound about the short end thereof to enclose said hub and members within the roll of material so wound, said members comprising round pins permanently secured in one of said heads.

VERNEUR E. PRATT.
GEORGE F. GRAY.

REFERENCES CITED

The following references are of record in the file of this patent:

UNITED STATES PATENTS

| Number | Name | Date |
| --- | --- | --- |
| 530,307 | Hopkins | Dec. 4, 1894 |
| 688,652 | Krug | Dec. 10, 1901 |
| 898,320 | Chesterman | Sept. 8, 1908 |
| 1,095,723 | Frisoli | May 5, 1914 |
| 1,498,133 | Swen | June 17, 1924 |
| 1,649,470 | Hayden | Nov. 15, 1927 |
| 1,817,217 | Victor | Aug. 4, 1931 |
| 1,829,482 | Hayden | Oct. 27, 1931 |